United States Patent [19]

Hosono

[11] 4,398,250
[45] Aug. 9, 1983

[54] ELECTRONIC CASH REGISTER MUTUAL TRANSMISSION SYSTEM FOR PLURALITY OF CASH REGISTERS

[75] Inventor: Taiichi Hosono, Fussa, Japan

[73] Assignee: Casio Computer Co., Ltd., Tokyo, Japan

[21] Appl. No.: 199,239

[22] Filed: Oct. 21, 1980

[30] Foreign Application Priority Data

Oct. 31, 1979 [JP] Japan .............................. 54-140940
Oct. 31, 1979 [JP] Japan .............................. 54-140941

[51] Int. Cl.³ .............................................. G06F 15/24
[52] U.S. Cl. ................................... 364/404; 364/900
[58] Field of Search ......................... 364/404, 401, 900

[56] References Cited

U.S. PATENT DOCUMENTS

| | | | |
|---|---|---|---|
| 3,541,526 | 11/1970 | Levy et al. | 364/900 |
| 3,898,622 | 8/1975 | Maynard et al. | 364/900 |
| 4,075,696 | 2/1978 | Shinoda et al. | 364/404 |
| 4,159,533 | 6/1979 | Sakurai | 364/900 |
| 4,266,271 | 5/1981 | Chamoff et al. | 364/401 X |

FOREIGN PATENT DOCUMENTS

2319849 9/1974 Fed. Rep. of Germany .
1399220 6/1975 United Kingdom .

Primary Examiner—Edward J. Wise
Attorney, Agent, or Firm—Frishauf, Holtz, Goodman & Woodward

[57] ABSTRACT

In an electronic cash register mutual transmission system, a plurality of electronic cash registers each having a memory for storing total data are electrically connected to each other. A search is made to confirm whether the classified sales data storage area is present in the memory of an electronic cash register which corresponds to the classified data inputted from another of the electronic cash registers. If it is present, the summing is performed in the memory of the former electronic cash register. If it is absent, the classification data is transmitted to another electronic cash register. The former electronic cash register outputs a request signal for data transfer to other electronic cash registers. In response to this request signal, the other electronic cash registers transfer the total data for printing by the former electronic cash register.

4 Claims, 8 Drawing Figures

| GOODS NUMBER CODES | AMOUNTS DATA | MACHINE NUMBER | END FLAG |
|---|---|---|---|

ELECTRONIC CASH REGISTER MUTUAL TRANSMISSION SYSTEM FOR PLURALITY OF CASH REGISTERS

Big stores such as department stores and super markets are divided into many sales sections, each of which sells particular types of goods. An electronic cash register is provided in each of these sales sections, and the goods sold in each section are registered by the electronic cash register of the respective section. Consequently, when a customer buys goods in a plurality of sales sections, he or she must go only to the electronic cash register assigned to the respective section for payment of the goods. This is inconvenient for the customer, and fails to provide the best service to the customer.

Furthermore, for checking and totaling sales total data registered in each electronic cash register in a store, the person in charge must operate each cash register for summing. Sometimes, it is desirable to total all of the sales data stored in each electronic cash register to obtain the sum for the whole store or to prepare other kinds of information for reference. In such a case, an on-line system connecting an electronic computer for totaling sales data with each electonic cash register has been conventionally used. Thus, in addition to the electronic cash registers arranged in the store, an electronic computer for totaling the sales data has been required, resulting in an extremely costly system.

The present invention relates to an electronic cash register mutual transmission system capable of transmission of data between a plurality of electronic cash registers.

SUMMARY OF THE INVENTION

According to the present invention, an electronic cash register mutual transmission system for a plurality of cash registers comprises input means for inputting amount data including associated classification data; first memory means having a plurality of storage areas for storing total data of the input amount data for each classification; a central processing unit coupled to the input means and to the first memory means for adding the input amount data to the total data in a specified storage area of the first memory means; transmission means for transmitting, to at least one of a plurality of cash registers, amount data and classification data input from the input means when a storage area specified by the inputted classification data does not exist in the first memory means; and connection means coupled to the transmission means for connecting together a plurality of cash registers by way of the transmission means.

With such a construction, registering goods of various kinds bought at different sales sections may be performed at a single electronic cash register. Thus, it is not necessary to input goods of every sales section with the corresponding electronic cash register, unlike in the case of conventional systems, so that it is very convenient for customers. The memory of the electronic cash register at a sales section may only require capacity for the number of the classifications assigned to the respective sales sections, so that the capacity of the memory to be included in each electronic cash register may be made smaller. It is not necessary to check and total for each electronic cash register, facilitating checking and totaling operations. The plurality of electronic cash registers are connected for sequentially checking and totaling operations, thereby shortening the operation time.

This invention can be more fully understood from the following detailed description when taken in conjunction with the accompanying drawings, in which:

DETAILED DESCRIPTION

Figure 1:
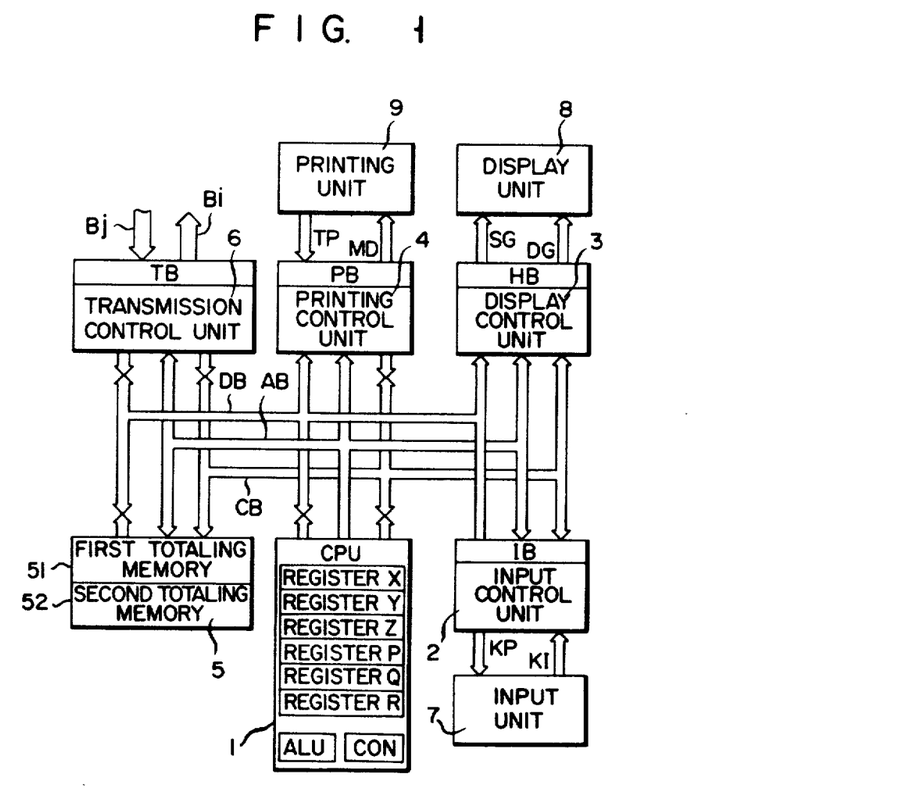
FIG. 1 is a circuit diagram of an electronic cash register.

FIG. 1 is a circuit diagram of an electronic cash register wherein numeral 1 denotes a CPU. CPU 1 are disposed an operaion (arithmetic) unit, a control unit and a plurality of registers for storing operation data, input data, display data, printing data, transmission data, and so on. For example, as shown in FIG. 1, there are provided a register X for storing goods number data, a register Y for storing amount data, a register Z for storing a machine number, a register P for storing aggregate sales data, a register Q for storing a machine number and a register R for storing the end flag showing the sales data added to the sales total of the goods of the same classification. An input control unit 2, a display control unit 3, a printing control unit 4, a totaling memory 5, and a transmission control unit 6 are connected to the CPU 1 through a data bus DB, and an address bus AB and a control bus CB.

An input unit 7 is connected to the input control unit 2 which supplies it with a timing signal KP for sampling. When keys are operated at the input unit 7, the timing signal KP is selected according to the operated key and is transmitted as a key input signal KI to an input buffer IB disposed in the input control unit 2.

A display unit 8 is connected to the display control unit 3 which performs display operations in response to a segment signal SG and a digit signal DG obtained by decoding the data in a display buffer HB inside the display control unit 3.

A printing unit 9 is connected to the printing control unit 4. The printing unit 9 transmits a printing position signal TP of a printing drum (not shown) provided therein to the printing control unit 4. The printing control unit 4 transmits to the printing unit 9 a printing drive signal MD generated by a correspondence of the printing position signal TP with data inside a printing buffer PB inside the printing control unit 4. When a predetermined hammer is driven in response to the printing drive signal MD, the printing unit 9 performs the printing operation to print the sales data, etc. on a journal paper sheet or a receipt paper sheet.

Transmission data is transferred from the CPU 1 to a transfer buffer TB inside the transmission control unit 6 and is transmitted to another electronic cash register through a bus line Bi. To the transfer buffer TB is also supplied transmission data from another electronic cash register through a bus line Bj; this data is written in the register inside the CPU 1 in response to a writing signal supplied from the CPU 1 through the control bus CB.

Figure 2:
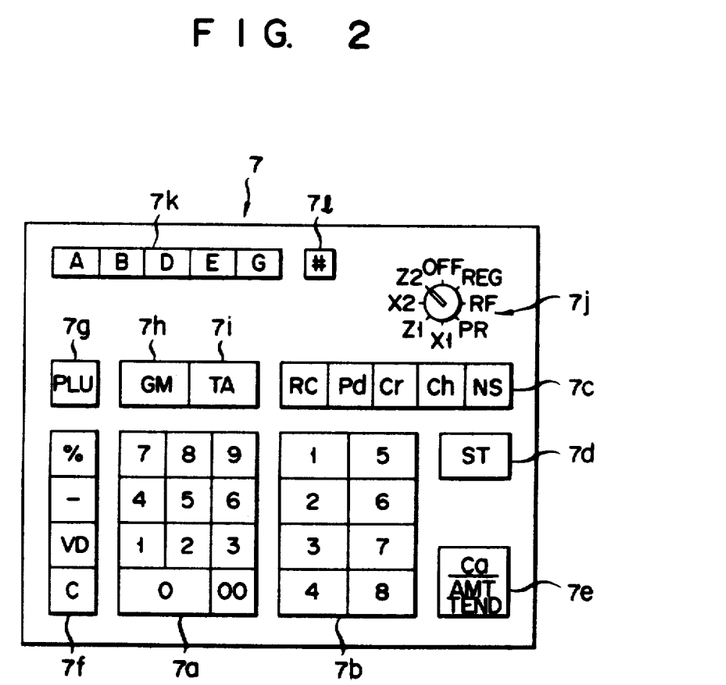
FIG. 2 shows a keyboard thereof.

FIGs. 2 is a view illustrating the keyboard of the input unit 7. The keyboard has entry keys 7a for inputting the amount of a sale; department keys 7b for registering goods according to the classification; transaction keys 7c for specifying receipt, paid out, credit, charge, and no sale; a subtotal key 7d for printing and displaying the sum for the same customer; a cash/amount tender key 7e for use with sale in cash and for calculation of change; function keys 7f for performing percentage, subtraction, void and clear; a price look up key 7g for reading out a unit price stored in advance for registering; a goods number key 7h for inputting the goods number; and a total amount key 7i for inputting the total amount specified by the goods number key 7h. The keyboard further includes a mode switch 7j for specifying the modes "OFF", "REG", "RF", "PR", "X1", "Z1", "X2", and "Z2". The "OFF" mode is the mode specified when the electronic cash register is not in use. The "REG" mode is the mode specified for registering sales data. The "RF" mode is the mode specified for canceling data which is already registered. The "PR" mode is the mode specified for storing in advance the unit price or the like in the totaling memory 5. The "X1" mode is the mode specified for printing the data inside the totaling memory 5 of the corresponding electronic cash register. The "Z1" mode is the mode specified for clearing the memory after printing the data inside the totaling memory 5 of the corresponding electronic cash register. The mode "X2" is the mode specified for printing the data inside the totaling memory 5 of the corresponding electronic cash register and the data transmitted from the totaling memories 5 of the other connected electronic cash registers. The mode "Z2" is the mode specified for clearing the data after outputting this data from the totaling memory 5 of the corresponding electronic cash register and for printing the data transmitted from the totaling memories 5 of the other electronic cash registers resistors for clearing the data in the totaling memories 5. 7k is a clerk key and 7l is a non-add key for inputting a machine number or the like.

Figure 3:
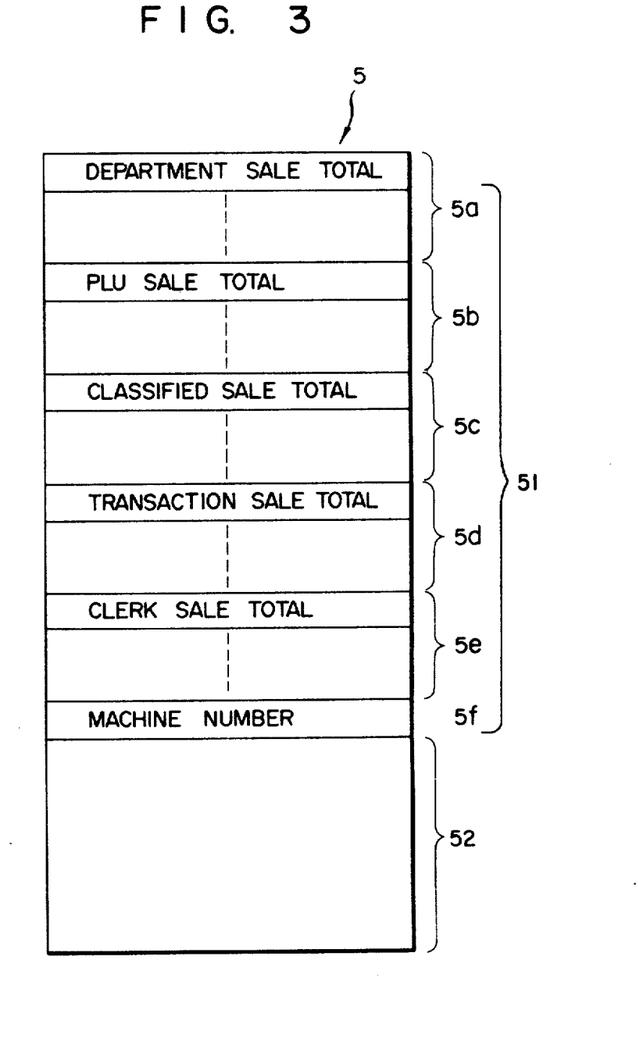
FIG. 3 shows memory maps of a totaling memory thereof.

FIG. 3 is a view showing the storage areas of the totaling memory 5 which includes a first totaling memory 51 and a second totaling memory 52. The first totaling memory 51 has an area 5a for storing the department sale total, an area 5b for storing the PLU sale total, an area 5c for storing the sale total for each separate goods number, an area 5d for storing the transaction sale total, and an area 5e for storing the clerk sale total. The first totaling memory 51 further has an area 5f for storing the machine number of the electronic cash register. The second totaling has a storage capacity corresponding to the total storage capacity of the storage areas 5a to 5e and stores the total data from other cash registers.

Figure 4:
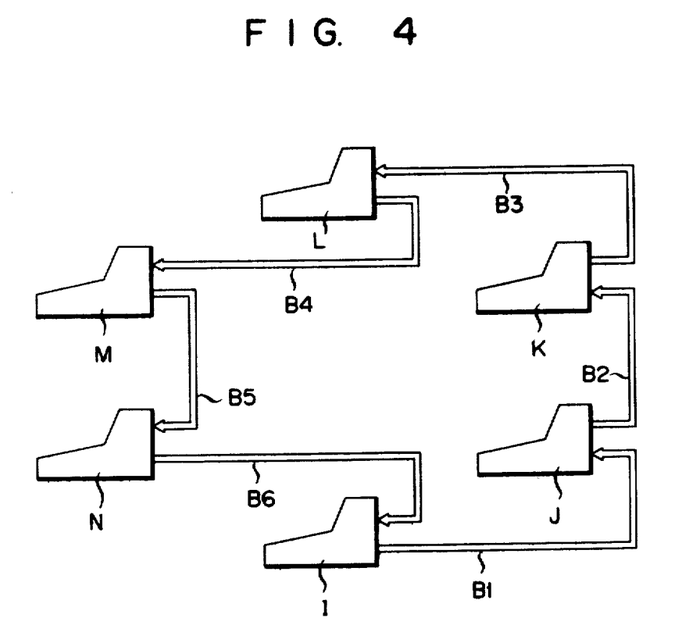
FIG. 4 is a view illustrating the construction of a system connecting a plurality of electronic cash registers as shown in FIG. 1.

FIG. 4 shows the connections between electronic cash registers I to N with bus lines B1 to B6. The PLU numbers, goods numbers and machine numbers stored in the respective totaling memories 5 of the respective registers I to N are assigned mutually different goods number codes. The transmission data transmitted from each electronic cash register is sequentially transferred from one register to the immediately adjacent register, for example, I→J→K→L→M→N→I.

Figure 5:
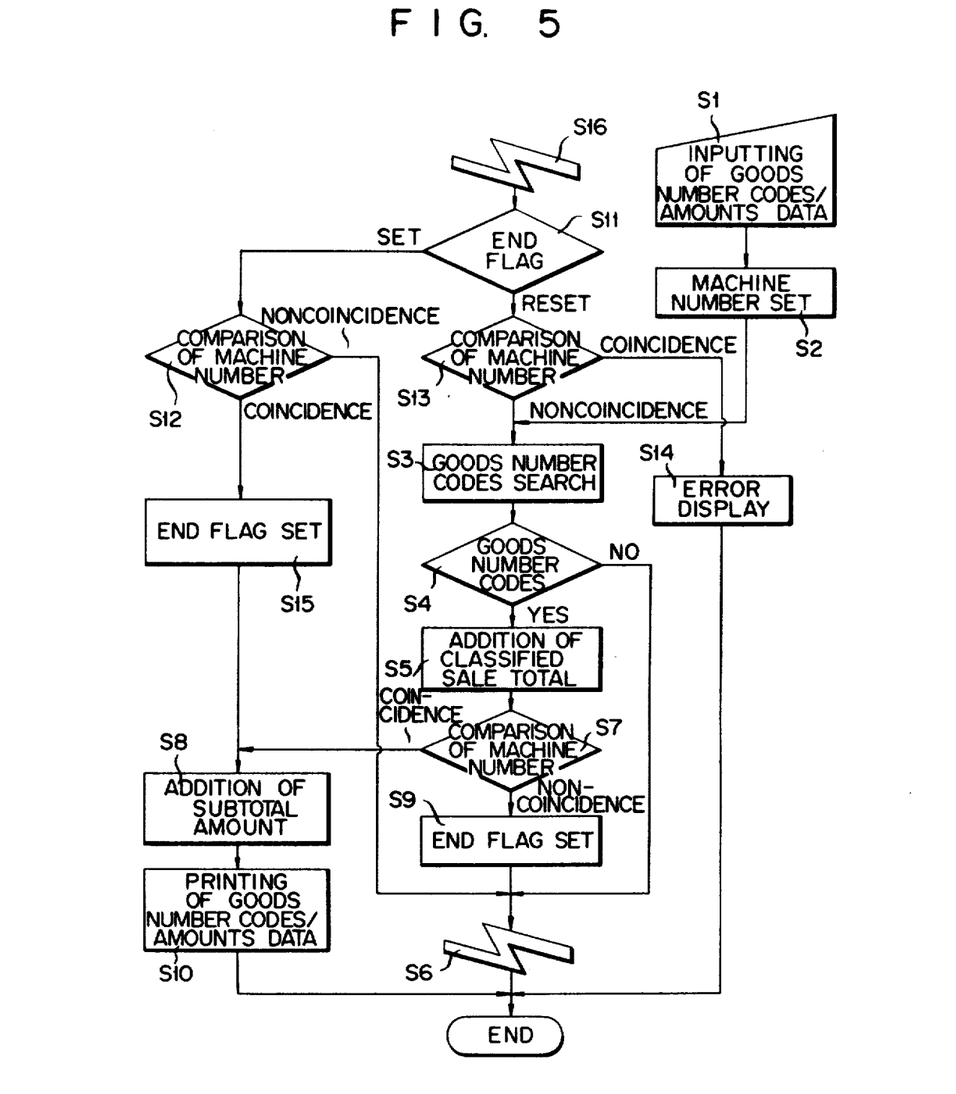
FIG. 5 is a flow chart showing the registering operation in the system shown in FIG. 4.

The operation of each electronic cash register of the construction and connection described above will be described with reference to the flow chart shown in FIG. 5. FIG. 5 is a flow chart showing the registering operation carried out by the CPU's of the individual electronic cash registers I~N. The registering operation is carried out based on amount data and goods number codes input from the input unit 7 or the transmission control unit 6. The electronic cash register I shown in FIG. 4 is arranged at the sale section for medical products, the electronic cash register J is arranged at the sale section for foods and so on, so that respective registers I to N are arranged at different sale sections and the goods number codes corresponding to the group of goods sold at every sale section are stored in goods number sale total classified storage areas 5c in the totaling memories 5.

The normal registering operation for registering with the electronic cash register I for a customer who has bought medical products will first be described. The registering operation, based on inputted data from input unit 7, starts from step S1 in FIG. 5. In a step S1 shown in FIG. 5, when the key operation is performed with the entry key 7a, the goods number key 7h, the entry key 7a, and the total amount key 7i of the input unit 7 in that order indicated, the operation signals are supplied to the CPU 1 through the input buffer IB and goods number codes are stored in an inputting register X and registering data is stored in an inputting register Y provided in the CPU 1. A step S2 is then executed wherein the machine number stored in the machine number storage area 5f of the totaling memory 5, (the machine number of the electronic cash register I in this case) is read out, supplied to the CPU 1 through the data bus DB and set in the inputting Z register provided in the CPU 1. A step S3 is then executed and the goods number codes stored in the goods number classified total area in the memory 5 are sequentially searched. In a step S4 to follow, it is judged whether the same goods number codes as those of the searched goods number codes are stored in the inputting register X. If the answer is positive or YES, a step S5 is initiated. If the answer is negative or NO, a step S6 is initiated. When medical products are registered in the electronic cash register I, the answer is positive or YES so that the next step S5 is initiated. The amount data stored in the goods number classified sale total storage area 5c inside the totaling memory 5 corresponding to the goods number code of the register X is read out in the register P in the CPU 1. This amount data stored in register P and the input amount data stored in register Y are added, and the sum is stored in the register P and then is stored in the area 5c again. Then a step S7 is executed. The machine number of this electronic cash register stored in the machine number storage area 5f of the totaling memory 5 is read out to the register "a" in the CPU 1. It is then judged whether it corresponds to the machine number stored in the inputting register Z for the CPU 1. If they correspond with each other, a step S8 is initiated. If they do not, a step S9 is initiated. In the case when data is inputted from the self-input unit, it is judged that they correspond with each other so that the step S8 is executed. The amount data stored in the inputting register Y of the CPU 1 is added for obtaining the subtotal amount data. A step S10 is then executed. The goods number code and the amount data stored in the inputting registers X, Y of the CPU 1 are supplied to the printing buffer PB inside the printing control unit 4, and the printing drive signal MD based on the contents of the printing buffer PB is fed to the printing unit 9. Consequently, a receipt with the goods number code, the amount and the subtotal of the registered medical products printed on it is issued from the electronic cash register I. The amount data of the inputted medical products is classified by the goods number codes in the totaling memory 5 of the electronic cash register I as well as summed to be stored.

Figure 6:
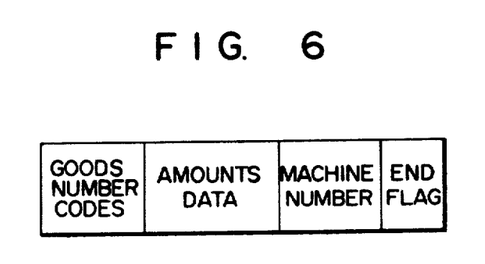
FIG. 6 is a view illustrating the format of the transmission data to be transferred from one electronic cash register to another.

The operation for registering with the electronic cash register I for a customer who has bought food will be described. After the steps S1 and S2 are executed, the goods number code, the amount data and the machine number of the electronic cash register I are respectively stored in the inputting registers X, Y and Z of the CPU 1. After the steps S3 and S4 are executed subsequently, the goods number codes of the foods stored in the register X of the CPU 1 are judged not to be stored in the goods number classified sale total storage area 5c of the totaling memory 5, and the step S6 is executed. The data stored in the respective registers in the CPU 1 is transferred as transmission data to the transmission control unit 6 of the electronic cash register J through the bus line B1 and the transmission control unit 6 of the electronic cash register I. The transmission data here consists of the goods number data, the amount data, the machine number and an end flag as shown in FIG. 6. The end flag is set to become "1" after the total amount is summed to the goods number classified sale total and is "0" before summation.

Figure 8:
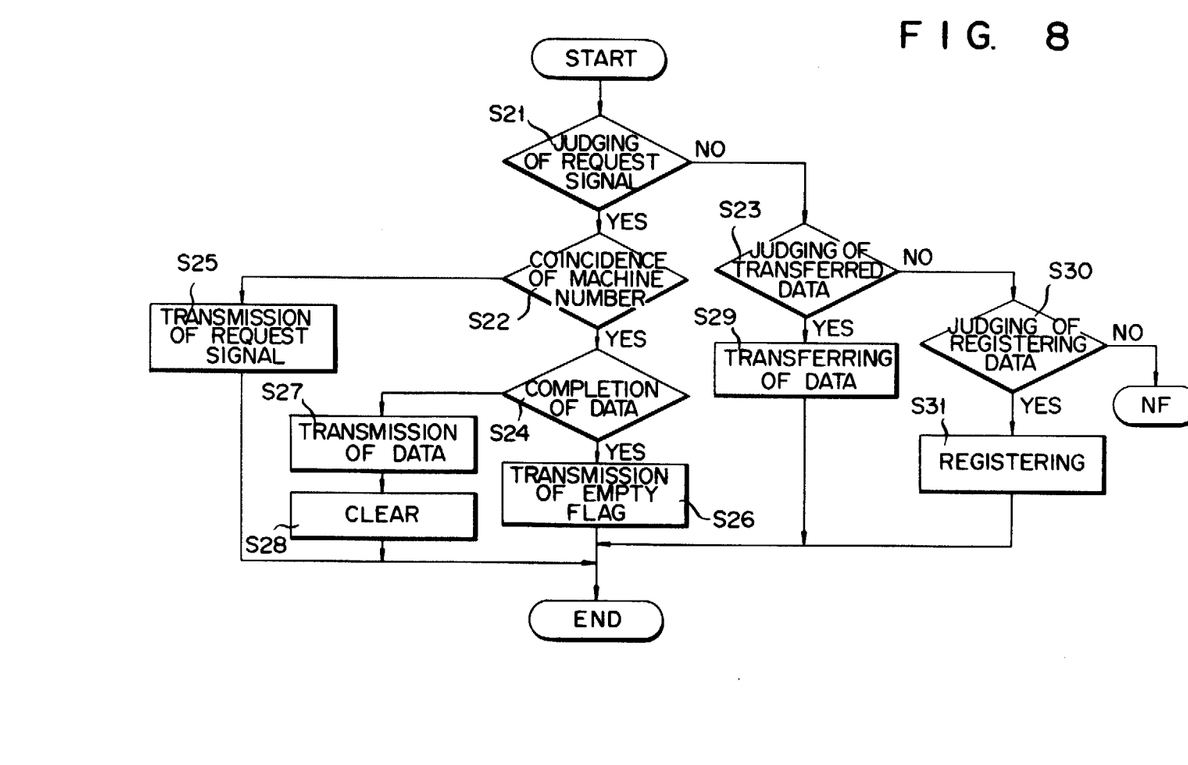

The transmission data transferred from the electronic cash register I is transmitted in this manner to the electronic cash register J. In cash register J, the process steps S21, S23 and S30, shown in the flow chart of FIG. 8, are executed. After the received data is confirmed as the registering data, the registering process of step S31 is executed as shown in the detailed flow chart of FIG. 5. Namely, the registering process based on the data input from the transmission control unit 6 starts from the step S16 of FIG. 5. The electronic cash register J receives the data in a step S16, goods number data, registering data, and machine number are stored in the registers X, Y and Z respectively, and an end flag is stored in the register R. In executing a step S11, it is judged whether the end flag of the transmission data is set or reset. If it is judged to be set, a next step S12 is executed. If it is judged to be reset, a step S13 is executed. Since the end flag is reset in the case of the example, the step S13 is executed. The machine number of the electronic cash register J stored in the machine number storage area 5f of the totaling memory 5 is read out to the CPU 1 and is compared with the machine number of the transmission data stored in the CPU 1. A judgement is made as to whether or not they correspond with each other. They are judged not to correspond with each other in the case of the example, so the step S3 is executed. The goods number classified sale total storage area 5c of the totaling memory 5c is searched. In the next step S4, if it is judged that the same goods number code is stored, the amount data for the foods among the transmission data transmitted from the electronic cash register I is summed in the step S5 for storage in the corresponding goods number classified sale total storage area 5c of the totaling memory 5 of the electronic cash register J. If the machine number is judged not to correspond to the stored number in the execution of the step S7, the next step S9 is executed. In the execution of the step S9, the end flag is set in the transmission data to become "1", and the transmission data is transmitted from the CPU 1 of the electronic cash register J to the transmission control unit 6 of the electronic cash register K through the transmission control unit 6 and the bus line B2.

Then the step S11 is executed in the electronic cash register K. If it is judged that the end flag is set, the step 12 is initiated. In the step S12, the machine number of this register stored in the machine number storage area 5f of the totaling memory 5 is read out to the register Q for comparison with the machine number of the transmission data stored in the register Z in CPU 1. A judgement is made as to whether or not they correspond with each other. If they do, a step S15 is initiated. If they do not, the step S6 is initiated. They are judged not to correspond with each other in the case of the example, so the step S6 is executued. The transmission data is transmitted from the electronic cash register K to the electronic cash register L through the bus line B3. The steps S11 and S12 are executed in the electronic cash register L in the manner described above. As a result, the machine number of the transmission data is judged not to correspond with the machine number of the electronic cash register L. The step S6 is executed next. The transmission data is transmitted from the electronic cash register L to the electronic cash register M through the bus line B4. The transmission data in the electronic cash register M is transmitted following the same process as in the above. The transmission data is transferred to the electronic cash register I through the bus line B6.

The step S11 is executed again in the electronic cash register I. In the execution of the step S12, the machine number of the transmission data is judged to correspond to the machine number stored in the totaling memory 5 so that the step S15 is executed. In the execution of the step S15, the end flag of the transmission data set in the register R data is reset, and the step S8 is initiated. In the execution of the step S8, the amount data stored in register Y among the transmission data stored in each register X, Y, Z and R of the CPU 1 is added to obtain the subtotal. The step S10 is then executed and the goods number codes and the amounts of the respective food items are printed by the printing unit 9 of the electronic register cash I. When the end flag is reset in the step S11 and the machine numbers are judged to correspond in the step S13, it means that the inputted goods number code is not stored in the electronic cash registers I to N. An error display is effected in a next step S14. The amount data inputted with the goods number codes by the electronic cash register I in the manner described above is transferred to the electronic cash register J and is summed separately for each goods number code in the totaling memory 5 for storing. A receipt based on the input data is issued from the electronic cash register I. Thus, an operator is capable of registering goods of other sale sections on his or her electronic cash register by the normal registering operation, and handing the receipt based on the input data.

In the above embodiment, it is possible to print the symbols representing the electronic cash register which has registered the amount data on a receipt in a manner to correspond to the respective amount data printed on it.

In the above embodiment, the transmission data storage areas in the totaling memories 5 of the respective electronic cash registers for storing the sums of the amount data transmitted from the other electronic cash registers may be arranged for each different classification, so that printing may be performed while checking and totaling for facilitating the distinction between the transmitted data and the directly inputted data.

Further, although the above embodiment has been described with reference to the case for registering the goods numbers, the present invention is similarly applicable to an electronic cash register transmission system having a PLU (price look up) function wherein the unit price of each goods is stored in advance and the corresponding unit price is read out from other electronic cash registers upon inputting the code.

In the above embodiment, the amount data as well as the goods classified data are inputted for sequential search of all of the electronic cash registers. However, the present invention is not limited to this construction. The classified data representing the electronic cash register of the sale section may be specified by the key operation for summing the sales data in the storage area of that electronic cash register.

Figure 7:
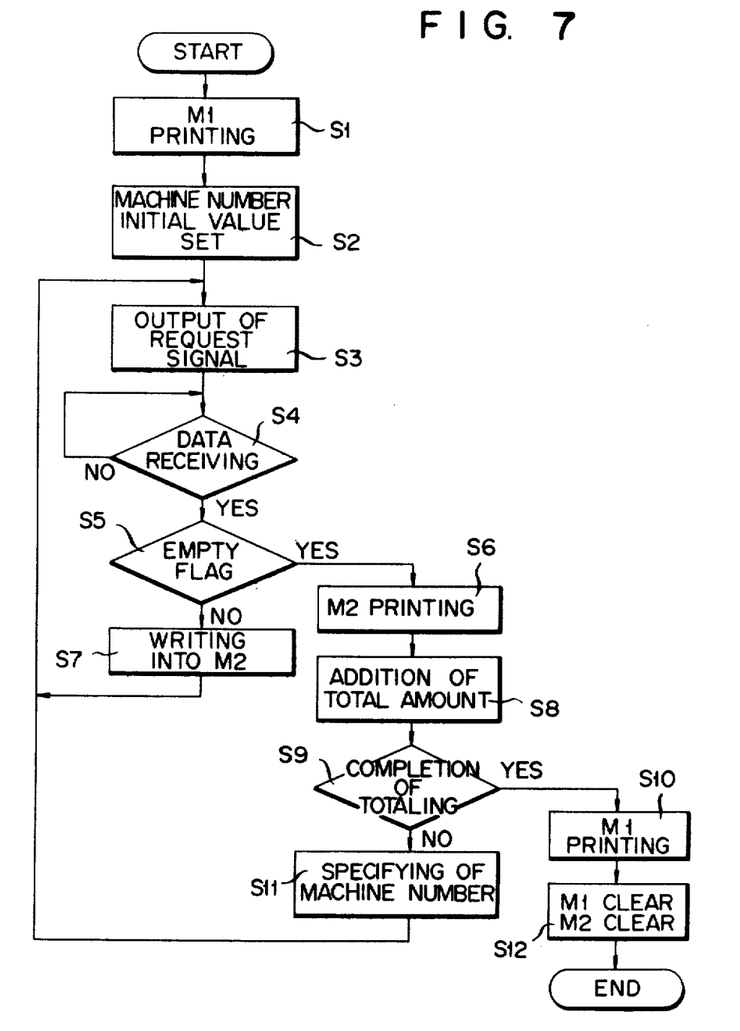
FIGS. 7 and 8 are each flow charts illustrating the resetting operation of the system shown in FIG. 4.

The following is an explanation of the totaling operations that take place when electronic cash register I is operated simultaneously with the other cash registers J~N. In this case, the total data totaled to the individual totaling units 5 of the electronic cash register I~N is printed out by the printing unit 9 of ECR I. FIG. 7 is a flow chart showing a totaling process at the electronic cash register I. When the control lock 9 of the electronic cash register I is set to the totaling mode "Z2" and a CA/AMT TEND key 7e is operated, the program shown in FIG. 7 is executed by the CPU 1 of the electronic cash register I. In the execution of the step S1, by an address supplied from the CPU 1 through the address bus line AB, the total data M1 stored in the storage areas 5a to 5e of the first totaling memory 51 are sequentially read out and written in the register P of the CPU 1 through the data bus DB. The data in the register P is supplied to the printing buffer PB of the printing control unit 4 through the data bus DB. Thus, the printing drive signal MD based on the contents of the printing buffer PB is supplied to the printing unit 9, the total sales data is printed on the recording paper sheet. Thus, all data stored in the storage area 5a~5e are printed on the paper sheet. The step S2 is then executed. Among the electronic cash registers J to N, the machine number of the electronic cash register which first requests the transfer of the total data is set in the transfer register Z of the CPU 1. In the case of the example, the machine number of the electronic cash register J is set as the initial value for the machine number. Then the step S3 is executed. The request signal for transferring the total data is outputted with the machine address, and these are supplied to the electronic cash register J through the transmission control unit 6 and the bus line B1. The step S4 is then executed. The CPU 1 judges as to whether or not the data has been transferred from the electronic cash register J in response to the request signal. If the answer is positive or YES, the step S5 is executed. If the answer is negative or No, the step S4 is executed repeatedly until the data is received.

When the data is transferred from the electronic cash register J, the step S5 is then executed, and a judgement is made as to whether or not the empty flag of the transferred data is "1". The empty flag becomes "1" when all of the data stored in the storage areas 5a to 5e of the first totaling memory 51 is read out. When the empty flag is judged not to exist, the next step S7 is executed and the transferred total data of the electronic cash register J is written in the second totaling memory 52. Then the process returns to the step S3, and the step S4 and S5 are executed. The steps S7, S3, S4, and S5 are executed repeatedly until the empty flag is transferred from the electronic cash register J. When the total data transmitted from the first totaling memory 51 of the electronic cash register J is all transferred and the empty flag is finally received, the process proceeds from the step S5 to the step S6. In the execution of the step S6, the data M2 stored in the second totaling memory 52 are sequentially read out, supplied to the printing buffer PB and printed on the recording paper sheet. Thereafter, the paper sheet is fed out a predetermined length. The step S8 is then executed. The total data M1 stored in the storage areas 5a to 5e of the first totaling memory 51 and the total data M2 stored in the storage area of the second totaling memory 52 are read out to the registers Y and P of the CPU 1 and added according to the classification; the added result is written in the storage areas 5a to 5eof the first totaling memory 51. The step S9 is then executed. It is judged as to whether the totaling of the total data of all the other specified electronic cash registers has been completed. If the answer is positive or YES, the step S10 is executed. If the answer is negative or NO, the step S11 is executed. In the case of the example, totaling has been performed only for the electronic cash register J, so that the answer is negative or NO and the step S11 is executed.

In the step S11, the machine number specifying the electronic cash register J set in the register Z in the CPU 1 is renewed and the machine number specifying the electronic cash register K is set. The step S3 is then executed, and a request signal is transmitted to the electronic cash register K with its machine number. In the next step S4, the total data transmitted from the electronic cash register K is received. The steps S5 and S7 are then executed, and the total data is written in the second totaling memory 52. When all of the total data of the electronic cash register K is written in the second totaling memory 52, the empty flag is judged in the step S5 to be present. After the execution of the step S6, the total data of the electronic cash register K is printed on the recording paper, and the paper sheet is fed out a predetermined length. Then the step S8 is executed, and the total data of the electronic cash register I, J and K are stored in the storage areas 5a to 5e of the first totaling memory 51. The steps S9 and S11 are then executed and the machine number specifying the electronic cash register L is set in the register Z of the CPU 1.

The same operation as described above is executed for the electronic cash registers L, M and N. As a result, the total data stored in the electronic cash registers L, M and N are sequentially printed on the recording paper and the respective total data of the electronic cash registers I to N are summed in the storage areas 5a to 5eof the first totaling memory 51. When the totaling of all the electronic cash registers is completed, a positive or YES judgement is made in the step S9. The step S10 is then executed, and the total data M1 of the respective cash registers L to N stored in the storage areas 5a to 5e are printed on the recording paper sheet. The step S12 is then executed. The total data stored in the storage areas 5a to 5e of the first totaling memory 51 and in the second totaling memory 52 are all cleared. With the totaling operation of the electronic cash register I, the totaling operations of the total data for this electronic cash register and the other electronic cash registers J to N are all completed. As a result, a totaling report is prepared with the respective total data and the sum of the total data of the electronic cash registers I to N printed on a recording paper sheet.

The operation of the electronic cash register J for transferring the total data by the totaling operation of the electronic cash register I will be described with reference to the flow chart shown in FIG. 8. FIG. 8 is a flow chart showing the operation when a request signal, transferred data and registering data, etc. are input to the transmission control unit 6. When the machine number transmitted from the electronic cash register I coincides with the machine number of electronic cash register J, the cash register J transmits the totaled data in the storage areas $5a \sim 5e$ of the memory means to cash register I. In the execution of a step S21, it is judged whether or not a request signal is supplied to the transmission control unit 6 of the electronic cash register J. If the answer is positive or YES, a step S22 is executed. If the answer is negative or NO, a step 23 is executed. If the machine number of the electronic cash register J and the request signal are supplied from the electronic cash register I, the answer is positive or YES in the step S21 and the step S22 is executed. In the step S22, the transferred machine number stored in register Z and the machine number of this electronic cash register in the register "a" are compared. If the answer is positive or YES, i.e. if they are judged to be the same, a step S24 is then executed. If the answer is negative or NO, a step S25 is executed. In the case of the example, the answer is positive or YES so that the step S24 is initiated. Then it is judged as to whether the transfer of the total data stored in the totaling memory 5 is terminated. If the answer is positive or YES, the step S24 is executed. If the answer is negative or NO, a step S27 is initiated. In the case of the example, the answer is negative or NO, so the step S27 is executed. The total data stored in the storage areas 5a to 5e of the totaling memory 5 are transferred to the electronic cash register K through the transmission control unit 6 and the bus line B2. A step S28 is then executed and the total data transferred in the step S27 are all cleared. Every time the request signal is supplied at the second and third times and so on from the electronic cash register I, the steps S21, S22, S24, S27 and S28 are repeatedly executed. As a result, the total data are read out from the storage areas 5a to 5e to be transferred to the electronic cash register K, and the total data are thereafter cleared. After the total data stored in the storage areas 5a to 5e are all transferred and cleared, a positive or YES judgement is made in the step S24 so that the step S26 is initiated. In the step S26, an empty flag representing the completion of the transfer of the total data is transmitted to the electronic cash register K and all the operations to be effected in response to the request signal are completed. When the machine number stored in the request signal specifies the electronic cash registers K to N, a negative or NO judgement is made in the step S22, and the request signal is transferred to the electronic cash register K.

When the transmission data supplied from the electronic cash register I to the electronic cash register J is the transfer data of another electronic cash register, a negative or NO judgement is made in the step S21. A judgment is then made in the step S23 as to whether or not it is the transfer data. If the answer is positive or YES, a step S29 is executed. If the answer is negative or NO, a step S30 is executed. In the case of the example, the answer is positive or YES so that the step S29 is executed. The transfer data is transmitted to the electronic cash register K. When the transmission data from the electronic cash register I is the registering data, the step S30 is executed after the steps S21 and S23. A judgment is made as to whether or not the data is the registering data. If the answer is positive or YES, a step S31 is executed. If the answer is negative or NO, the data is processed as no function. The registering operation of step S31 is shown in the flow chart of FIG. 5. The registering operation of the registering data transmitted from the transmission control unit 6 is executed in sequence from step S11 of FIG. 5 as mentioned earlier, and if the pertinent goods number code exists, the registering data is totaled to the corresponding storage area $5a \sim 5e$ of the totaling unit 5.

The process when the transmission data is supplied to the electronic cash registers K to N is the same as that described with reference to the electronic cash register J, so the description thereof will be omitted.

The operations of cash registers I~N resulting from totaling operations in cash register I were explained in the aforementioned embodiment. When a checking operation is carried out at cash register I, step S12 of FIG. 7 is skipped and step S28 of FIG. 8 for cash registers J~N is skipped. The other operations are carried out exactly the same as the aforementioned totaling operation. In this way, by executing a checking/totaling operation at only one cash register, a checking calculation operation can be simultaneously carried out at the cash registers, resulting in simplification.

Further, although the above embodiment has been described with reference to the case of totaling all of the other electronic cash registers J to N connected to the electronic cash register I by operating the electronic cash register I, the present invention is not limited to this particular embodiment. The specified electronic cash register alone may be checked and totaled by operation of the input control unit 1 for specifying the machine number.

What is claimed is:

1. An electronic cash register mutual transmission system for a plurality of cash registers comprising:
input means for inputting amount data including associated classification data;
first memory means having a plurality of storage areas for storing total data of the input amount data for each classification;
a central processing unit coupled to said input means and to said first memory means for adding the input amount data to the total data in a specified storage area of said first memory means;
transmission means for transmitting, to at least one of a plurality of cash registers, amount data and classification data input from said input means when a storage area specified by the inputted classification data does not exist in said first memory means; and
connection means coupled to said transmission means for connecting together a plurality of cash registers by way of said transmission means.

2. The electronic cash register mutual transmission system of claim 1, comprising a second memory means coupled to said central processing unit, said second memory means including a plurality of storage areas for storing in each classification said total data of amount data transmitted from at least one cash register of a plurality of cash registers by way of said transmission means.

3. The electronic cash register mutual transmission system of claim 2, comprising printing means coupled to said central processing unit for printing said total data of said first and second memory means.

4. The electronic cash register mutual transmission system of claim 1, wherein said first memory means includes a storage area for storing a machine number; and said central processing unit includes means for comparing the machine number in said storage area of said first memory means with a machine number transmitted from at least one of a plurality of cash registers in accordance with read or reset operations of at least one of a plurality of cash registers, said central processing means further including means responsive to both machine numbers being equal for sending total data of said first memory means to said transmission means to be transmitted to at least one of a plurality of cash registers.

* * * * *